(12) United States Patent
Hazzard et al.

(10) Patent No.: US 12,261,948 B2
(45) Date of Patent: Mar. 25, 2025

(54) CREDENTIAL SHARING

(71) Applicant: Ivanti, Inc., South Jordan, UT (US)

(72) Inventors: Matthew Hazzard, Circle Pines, MN (US); Alex Ivanoff, Plymouth, MN (US)

(73) Assignee: Ivanti, Inc., South Jordan, UT (US)

( * ) Notice: Subject to any disclaimer, the term of this patent is extended or adjusted under 35 U.S.C. 154(b) by 278 days.

(21) Appl. No.: 17/822,545

(22) Filed: Aug. 26, 2022

(65) Prior Publication Data
US 2023/0067169 A1  Mar. 2, 2023

Related U.S. Application Data

(60) Provisional application No. 63/238,093, filed on Aug. 27, 2021.

(51) Int. Cl.
*H04L 9/08* (2006.01)
*H04L 9/32* (2006.01)

(52) U.S. Cl.
CPC ............ *H04L 9/085* (2013.01); *H04L 9/0825* (2013.01); *H04L 9/0891* (2013.01); *H04L 9/3268* (2013.01)

(58) Field of Classification Search
None
See application file for complete search history.

(56) References Cited

U.S. PATENT DOCUMENTS

2013/0311773 A1* 11/2013 Solin ................. H04L 9/006
713/158

* cited by examiner

*Primary Examiner* — Brian Whipple

(57) ABSTRACT

A method of credential sharing between users in a system includes creating a credential for a first user that is configured such that entry of secure details of the credential enables execution of an operation. The method includes receiving data indicative of a first selection of the credential and a second selection of a second user. The method includes encrypting the secure details such that the second user is capable of decrypting the secure details and other users are incapable of decrypting the secure details. The method includes appending a profile of the second user with encrypted secure details. The method includes receiving an execution request to perform the first operation from the second user and decrypting the secure details. After entry of the decrypted secure details, the method includes authenticating the second user using the secure details and enabling execution of the first operation by the second user.

18 Claims, 9 Drawing Sheets

| Credential Manager | | | | | | | | | |
|---|---|---|---|---|---|---|---|---|---|
| Credential: | Add | Edit | Delete | Merge | View Usage | Set as Default | Clear Default | Share | Take Ownership |
| User name | Name | | | | Share Status | Share Count | Shared With | | Owner |
| Service | Service Creds | | | | No | 0 | | | SHAVLIK\joe |
| Admin1 | Admin Creds (Default) | | | | No | 0 | | | SHAVLIK\joe |
| TestUser | Test User Creds | | | | Delegated To Me | 1 | SHAVLIK\joe | | \TestUser |
| PretendUser | Pretend User Creds | | | | Delegated To Me | 2 | SHAVLIK\joe, \TestUser | | \Lefty |

FIG. 6A

| Credential Manager | | | | | | | | | |
|---|---|---|---|---|---|---|---|---|---|
| Credential: | Add | Edit | Delete | Merge | View Usage | Set as Default | Clear Default | Share | Take Ownership |
| User name | Name | | | | Share Status | Share Count | Shared With | | Owner |
| Service | Service Creds | | | | Yes | 1 | Background Services | | SHAVLIK\joe |
| Admin1 | Admin Creds (Default) | | | | No | 0 | | | SHAVLIK\joe |
| TestUser | Test User Creds | | | | Delegated To Me | 1 | SHAVLIK\joe | | \TestUser |
| PretendUser | Pretend User Creds | | | | Delegated To Me | 2 | SHAVLIK\joe, \TestUser | | \Lefty |

FIG. 6B

Home New Import View Manage Tool Help

Machine Groups

⌦ Default Machine Groups
  +My Machine
  +My Domain
  +My Test Machines
  +Entire Network ⌦ My Machine Groups
  +Location-1 Servers
  +Location-2 Servers
  ...

Patch Mgmt

What Do You Want To Do
- New Agentless Operation
- View Machines
- Import CVE Into Patch Group Patch Health
X% Of Machines Accessed Operating System: OS-1 [Total], OS-2
Machines

Application Control

- New AC Config.
- Edit AC Config.
- View AC Event

AC Health
X% Of Machines Assigned

☐ Assigned
▨ Unassigned

Patch Content Updated MM/DD/YYYY Time

Helpful Links
How To Get Started
Best Practices
Contact Tech. Support

Status
Possible Issues Since MM/DD/YYYY
X  Viewed And Resolved

Data Versions (Content Feed)
Windows Patch Def.
Version
Windows Patch Def. (DB)
Version
Red Hat Patch Def
Version
Red Hat Patch Def (DB)
Version
...

CREDENTIAL SHARING

CROSS-REFERENCE TO RELATED APPLICATION

This application claims benefit of and priority to U.S. Prov. App. No. 63/238,093 filed Aug. 27, 2021, which is incorporated herein by reference in its entirety.

FIELD

The embodiments described in this disclosure are related to user credential management and in particular to sharing a credential between users with no visibility of credential secure details to a recipient user.

BACKGROUND

Credentials allow a user to authenticate herself to a computing system such as a managed network. In some systems, the credentials might include secure details such as a password and a username that the user enters into or otherwise provides to the computing system. Based on the secure details, the computing system authenticates the user and allows the user to perform tasks or operations on the computing system. Other secure details may include biometric elements, two-factor authentication, and the like. The credentials may be assigned to a particular group of individuals, a particular person, a particular account, a particular machine, or some combination thereof.

The credentials enable the computing system to control performance of specified tasks and to control access to specified information. Additionally, without providing the secure details associated with the credential, the user is unable to perform a specified task that is assigned to a particular role.

For instance, in a software management system, an administrative task such as deploying a patch may be reserved for an administrative role. To perform the administrative task, an administrative user provides her credentials to the software management system. Based on the credentials, the software management system may authenticate the administrative user as an individual assigned an admin role. The administrative user may accordingly be enabled to perform the administrative task.

Some computing systems include multiple users with different credentials. The different credentials are implemented to control system functions, operations, and data access. In these and other systems, some functions may be delayed or prevented because one or more of the users do not have a corresponding credential. For instance, a first user may perform a scan for application vulnerabilities and schedule a patch deployment to address the application vulnerabilities. The patch deployment may be a specific function assigned to a role of the first user and may require entry of secure details of the first credentials. Accordingly, a second user may be unable to perform the patch deployment because the second user does not have access to the secure details of the first credential or to a machine credential for a machine used by the first user.

To allow the second user to deploy the patch, the first user can provide the secure details to the second user, which may enable the second user to log into an account or a machine of the first user. However, provision of the secure details might introduce a security vulnerability to the system. In particular, the second user may use the secure details without expressed control by the first user. In addition, the second user may have access to default credentials. However, again the default credentials remove any checks or control on the action of the second user after the default credentials are provided to the second user.

Thus, a need exists for systems and methods that enable credential sharing between users of computing systems. Some embodiments described in the present disclosure enable the first user to share credentials to the second user and only the second user. The credentials might be shared temporarily and/or for a specific task. Following performance, the credentials may be withdrawn. Accordingly, the second user may have temporary privileges without compromising secure details of the credentials of the first user.

The subject matter claimed herein is not limited to embodiments that solve any disadvantages or that operate only in environments such as those described. Rather, this background is only provided to illustrate one example technology area where some embodiments described herein may be practiced.

SUMMARY

An embodiment includes a method of credential sharing between users in a computing system. The method may include creating a credential for a first user. The credential may be configured such that entry of secure details of the credential into the system enables execution of a first operation and without entry of the secure details the execution of the first operation is prevented. The method may include receiving data indicative of a first selection of the credential and a second selection of a second user. The first user and the second user may be users of a set of users managed in the system. Responsive to the data indicative of the first and second selections, the method may include encrypting the secure details. The secure details may be encrypted such that the second user is capable of decrypting the secure details and other users of the set of the users are incapable of decrypting the secure details. For example, the encrypting the secure details may include determining a unique session key specifically for a single instance of sharing the credential with the second user by the first user, encrypting the secure details with the unique session key, and encrypting the unique session key with a public key of the second user. The method may include appending a profile of the second user with encrypted secure details of the credential. The method may include receiving an execution request to perform the first operation from the second user. Responsive to the execution request, the method may include decrypting the encrypted secure details of the credential and entering decrypted secure details into the system. The decrypting the secure details of the credential may include decrypting the unique session key with a private key of the second user and descripting the secure details with the decrypted unique session key. After entry of the decrypted secure details, the method may include authenticating the second user using the secure details and enabling execution of the first operation by the second user.

Another aspect of an embodiment includes a non-transitory computer-readable medium having encoded therein programming code executable by one or more processors to perform or control performance of any combination of the operations of the methods of credential sharing described above.

Yet another aspect of an embodiment includes a system comprising one or more processors and a non-transitory computer-readable medium having encoded therein programming code executable by one or more processors to perform or control performance of any combination of the operations of the methods of credential sharing described above.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIGS. 6A-8 are screenshots of an example user interface that may be implemented in the credential sharing process of FIG. 2, all according to at least one embodiment described in the present disclosure.

DESCRIPTION OF SOME EXAMPLE EMBODIMENTS

Embodiments of the present disclosure relate to credential sharing in systems such as managed systems. The embodiments provide methods and systems in which credentials can be shared (1) with a particular user or particular users without any other users in the system being able to access the credential and (2) such that the particular user or users do not have visibility or access to secure details of the credential. Accordingly, some embodiments enable credential sharing without introducing additional security vulnerabilities such as password disclosure, widespread knowledge of default password, granting long-term access to credentials, etc.

Some embodiments implement an encryption process that is applied to the secure details of shared credential. The encryption process is based on a unique session key. The unique session key is specific for a single instance of sharing the credentials between two or more identified users. The unique session key is used to encrypt the secure details and then the unique session key is encrypted using a public key of a user to whom the credential is shared. Accordingly, only the private key of the user can decrypt the unique session key. And then the unique session key can be used to decrypt the secure details. Certificates of the unique session key and/or public-private key pair may be revoked, which disables the respective keys. Accordingly, some embodiments of the present disclosure provide a technical solution to improve credential sharing processes in conventional systems.

These and other embodiments are described with reference to the appended Figures in which like item number indicates like function and structure unless described otherwise. The configurations of the present systems and methods, as generally described and illustrated in the Figures herein, may be arranged and designed in different configurations. Thus, the following detailed description of the Figures, is not intended to limit the scope of the systems and methods, as claimed, but is merely representative of example configurations of the systems and methods.

Figure 1:
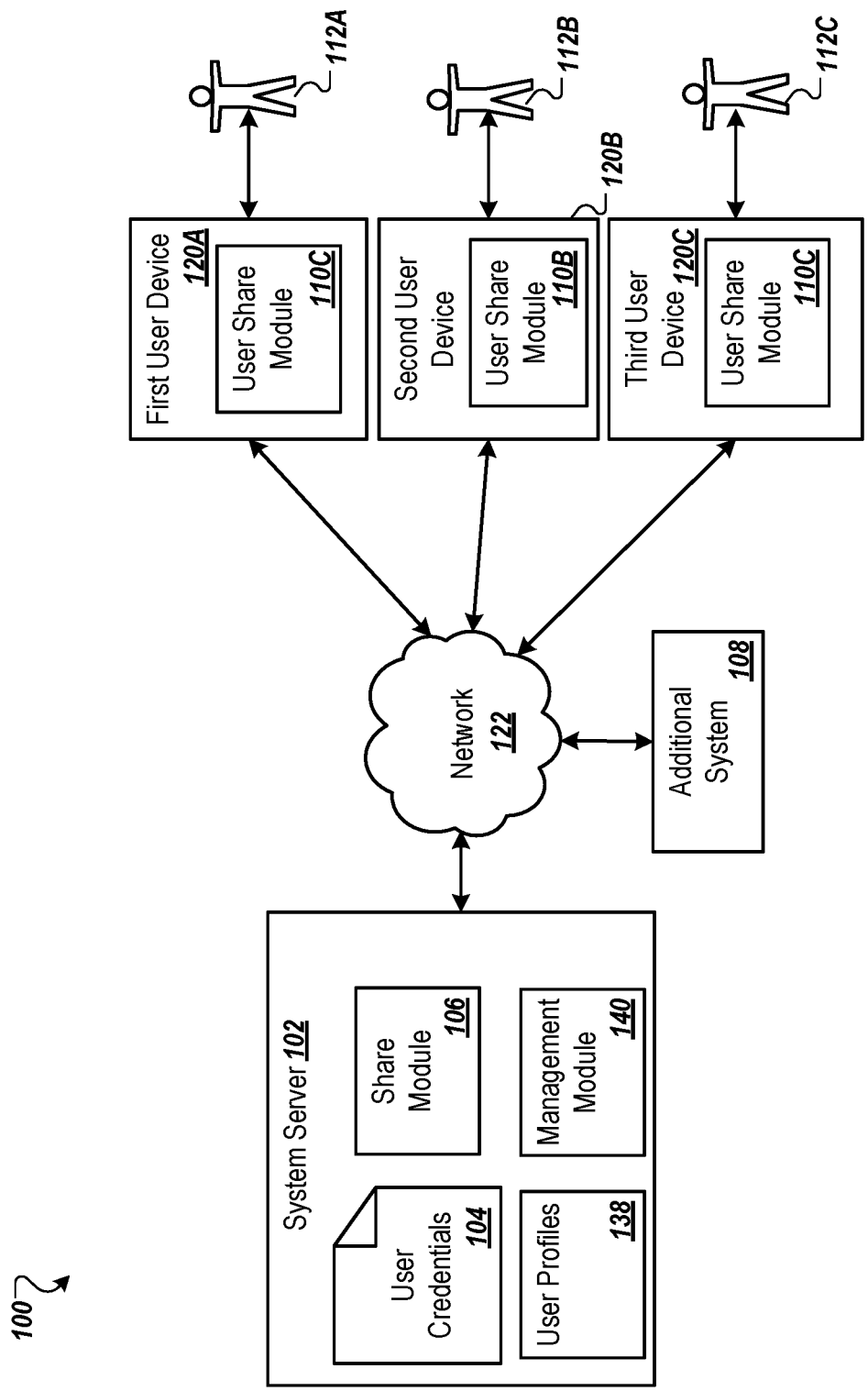
FIG. 1 depicts a block diagram of an example operating environment in which some embodiments may be implemented.

FIG. 1 is a block diagram of an example operating environment 100 in which some embodiments of the present invention can be implemented. The operating environment 100 includes a system server 102, user devices 120A-120C (generally, a user device 120 or user devices 120), and an additional system 108 that are configured to communicate via a network 122. Each of these components introduced in the following paragraphs.

The network 122 may include any communication network configured for communication of signals between the components (e.g., 102, 120, and 108) of the operating environment 100. The network 122 may be wired or wireless. The network 122 may have configurations including a star configuration, a token ring configuration, or another suitable configuration. Furthermore, the network 122 may include a local area network (LAN), a wide area network (WAN) (e.g., the Internet), and/or other interconnected data paths across which multiple devices may communicate. In some embodiments, the network 122 may include a peer-to-peer network. The network 122 may also be coupled to or include portions of a telecommunications network that may enable communication of data in a variety of different communication protocols.

In some embodiments, the network 122 includes or is configured to include a BLUETOOTH® communication network, a Wi-Fi communication network, a representative state transfer application protocol interface (REST API) communication network, an extensible messaging and presence protocol (XMPP) communication network, a cellular communications network, any similar communication networks, or any combination thereof for sending and receiving data. The data communicated in the network 122 may include data communicated via short messaging service (SMS), multimedia messaging service (MMS), hypertext transfer protocol (HTTP), direct data connection, wireless application protocol (WAP), or any other protocol that may be implemented in the components of the operating environment 100.

The system server 102, at least portions of the network 122, the user devices 120, and the additional system 108 may be integrated into a managed system. For instance, the system server 102 may operate to manage the user devices 120 and the additional system 108. Management of the user devices 120 and the additional system 108 may include providing discovery services, providing help desk services, providing application management, providing system update services, or combinations thereof. In some embodiments, the operating environment may be an on-premises system. In other embodiments, the operating system may communicate with a cloud-based server or SAAS system.

The user devices 120 include hardware-based computing devices that are configured to communicate data and information with the system server 102 and the additional system 108 via the network 122. Some examples of the user devices 120 may include network-capable computing devices such as laptop computers, tablet computers, smart phones, etc. The user device 120 may be associated with one of the users 112. For instance, the first user 112A may be associated with the first user device 120A, which may indicate that the first user 112A regularly operates and controls the first user device 120A. The users 112 may include individuals or groups of individuals who may be assigned a role relative to the system server 102. The role may control privileges and responsibilities of the users 112 and accordingly be related to a profile in user profiles 138 and user credentials 104.

For instance, a first user 112A may have a first role. The first role may be a supervisory role that controls an operation relative to the additional system 108. Accordingly, the system server 102 may generate a user profile and/or a user credential 104 to the first user 112A that enables performance of the operation. Roles of the second user 112B and the third user 112C may not have the privilege to control the operation. Accordingly, the user profiles 138 and the user credentials 104 of the second user 112B and the third user 112C may be configured to restrict or prevent the second user 112B and the third user 112C from implementing the operation. Throughout this application, credentials are described as being shared with a user 112. One with skill in the art may understand with the benefit of this disclosure that this description indicates that the credential is shared with a profile or role designated for the user 112 relative to the system server 102.

The additional system 108 may include a hardware-based computing device configured to communicate with the system server 102 and the user devices 120 via the network 122. The additional system 108 may be another network appliance that is managed by the system server 102. For instance, the additional system 108 may be another user device 120, a printer, a router, hub, another server, etc. that is managed.

The system server 102 may include a hardware-based computing device configured to communicate with the system server 102 and the user devices 120 via the network 122. The system server 102 may be implemented to enable the credential sharing among the users 112 or user devices 120.

For instance, the system server 102 includes a share module 106 and the user devices 120 include user share modules 110A-110C (generally, user share module 110 or user share modules 110). In the depicted embodiment, the share module 106 and the user share modules 110 are configured to implement sharing of user credentials 104 between the user devices 120 and/or users 112A-112C (generally, user 112 or users 112). For instance, a first user 112A may be a chief administrator and a second user 112B may be a subordinate administrator. The first user 112A may want to share her credentials with the second user 112B such that the second user 112B can conduct an operation such as an operation relative to the additional system 108. Additionally, the operation may be sensitive or important. Thus, the first user 112A may not want a third user 112C to know or have access to her credentials. The share module 106 and the user share modules 110 (collectively, share modules 106/110) may enable the first user 112A to share her credentials with the second user 112B. Additionally, after the second user 112B receives the credentials of the first user 112A, the second user 112B may want to further share the credentials with the third user 112C. The share modules 106/110 may be configured to allow the first user 112A to do so. In another example, the first user 112A may want to share her credentials with the second user 112B and the third user 112C at the same time. The share modules 106/110 may be configured to allow the first user 112A to do so. In each of these examples, after the credentials are shared, the users 112 who receive the credentials can perform tasks that are assigned to the user 112 who shares the credential.

In addition, in some embodiments, the first user 112A may be configured to share her credentials with a background service. The background service may enable multiple users 112 to use the credential.

As mentioned above the user credentials 104 and the user profiles 138 control which of the users 112 can perform operations and tasks relative to the additional system 108. The user credentials 104 and the user profiles 138 might include one or more credentials for each of the users 112. In addition, the user profiles 138 may include a profile for one or more of the users 112 or user devices 120. The user credentials 104 and the user profiles 138 may be modified through sharing of credentials. In particular, an operation or task assigned to one of the users 112 may be temporarily performed by a user 112 that is not assigned the operation or task by sharing credentials.

For example, in some embodiments, the share modules 106/110 may be configured to create the user credentials 104 for one or more of the users 112. The user credentials 104 are configured such that entry of secure details of the user credentials 104 enable execution of a particular operations. Additionally, without entry of the secure details the execution of the particular operations is prevented. The share modules 106/110 may be configured to receive a first selection of one of the user credentials 104 and a second selection of the second user 112B. Responsive to the first and second selections, the share modules 106/110 may encrypt the secure details such that the second user is capable of decrypting the secure details and other users 112 are incapable of decrypting the secure details.

In some embodiments the encrypting includes determining a unique session key specifically for a single instance of sharing the selected user credential 104 with the second user 112B by the first user 112A. The unique session key may be generated according to a secure cryptographic message syntax message standard and/or may include an advanced encryption standard (AES) key. Additionally or alternatively, the user credentials 104 are encrypted using NIST recommendations and FIBS 140-2 certified algorithms. Encryption of the secure details may include encrypting the secure details with the unique session key and encrypting the unique session key with a public key of the second user.

The share modules 106/110 may append a profile of the second user 112B with encrypted secure details of the selected user credential 104. The share modules 106/110 may receive an execution request to perform the first operation from the second user 112B. Responsive to the execution request, the share modules 106/110 may decrypt the secure details of the selected user credential 104 and enter decrypted secure details into the management module 140 or another system of the system server 102. In some embodiments, the decrypting the secure details may include decrypting the unique session key with a private key of the second user 112B and descripting the secure details with the decrypted unique session key. After entry of the decrypted secure details, the share modules 106/110 may enable or implement execution of the first operation by the second user 112B.

When the first user 112A wants to withdraw the shared credential, the share modules 106/110 may receive a withdraw notification from the first user 112A. Responsive to the withdraw notification, the share modules 106/110 may revoke a certificate associated with the encrypting of the secure details. The share modules 106/110 may then re-encrypt the credential using a public key of the first user 112A.

The share modules 106/110, the management module 140, and components thereof may be implemented using hardware including a processor, a microprocessor (e.g., to perform or control performance of one or more operations), a field-programmable gate array (FPGA), or an application-specific integrated circuit (ASIC). In some other instances, share modules 106/110, the management module 140, and components thereof may be implemented using a combination of hardware and software. Implementation in software may include rapid activation and deactivation of one or more transistors or transistor elements such as may be included in hardware of a computing system (e.g., the user devices 120 or the system server 102 of FIG. 1). Additionally, software defined instructions may operate on information within transistor elements. Implementation of software instructions may at least temporarily reconfigure electronic pathways and transform computing hardware.

Modifications, additions, or omissions may be made to the operating environment 100 without departing from the scope of the present disclosure. For example, the operating environment 100 may include one or more system servers 102, one or more user devices 120, one or more additional systems 108, or any combination thereof. Moreover, the separation of various components and devices in the embodiments described herein is not meant to indicate that the separation occurs in all embodiments. Moreover, it may be understood with the benefit of this disclosure that the described components and servers may generally be integrated together in a single component or server or separated into multiple components or servers.

Figure 2:
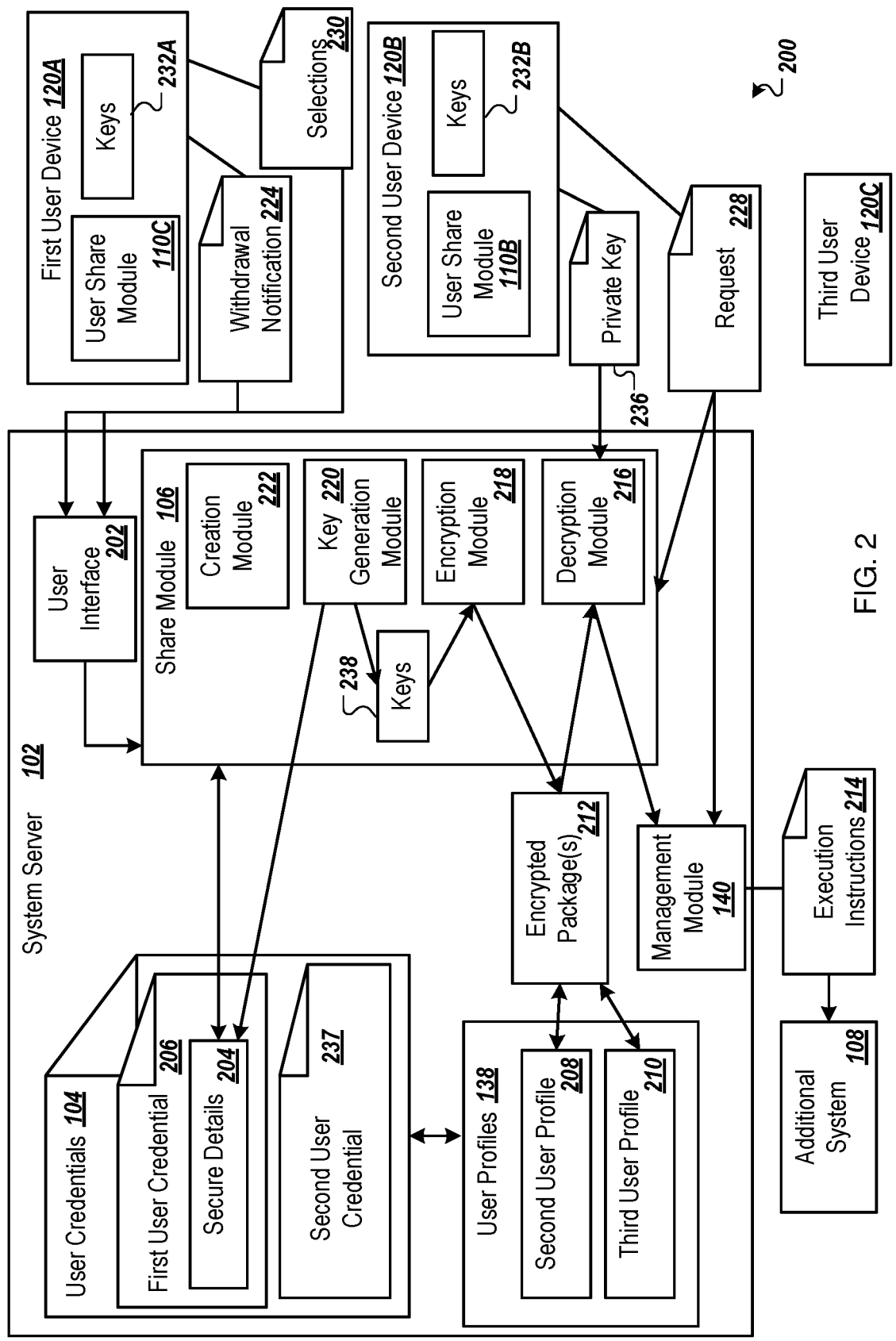
FIG. 2 depicts a block diagram of a credential share process that may be implemented in the operating environment of FIG. 1.

FIG. 2 is a block diagram of an example credential sharing process (sharing process) 200 that may be implemented in the operating environment 100 of FIG. 1 or another suitable operating environment. The sharing process 200 of FIG. 2 involves the system server 102, the additional system 108, and the user devices 120 described with reference to FIG. 1. Although not depicted in FIG. 2, communication of information may be via a network such as the network 122 of FIG. 1.

Figure 8:
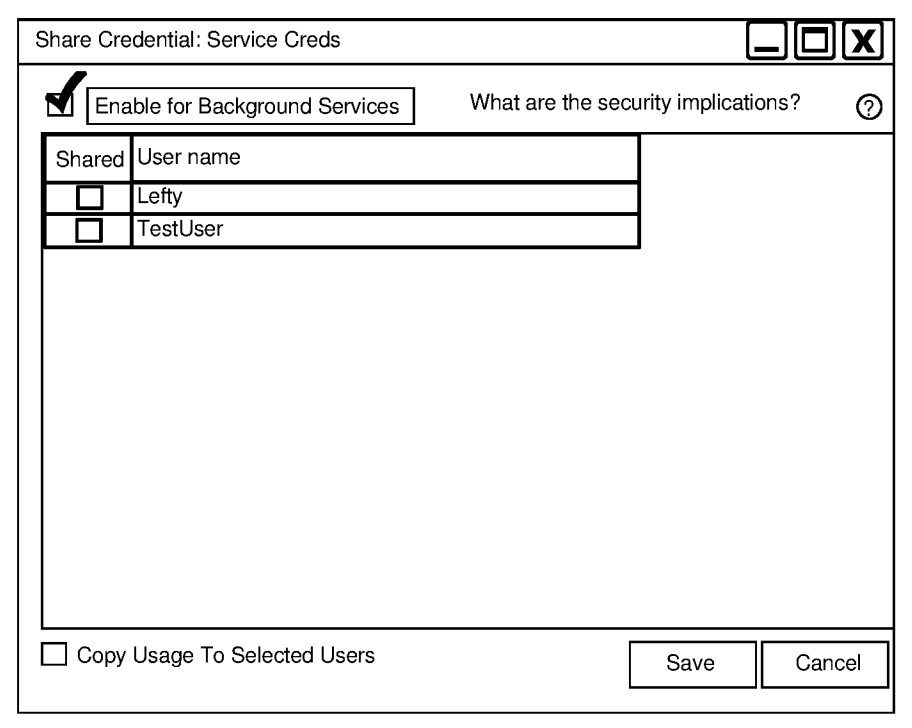

In the embodiment of FIG. 2, the system server 102 includes a user interface 202, the user credentials 104, the user profiles 138, the management module 140, and the share module 106. The user interface 202 may be configured to receive user input from the user devices 120 or directly into the system server 102. For example, in some embodiments, selections 230, withdrawal notifications 224, and requests 228 may be input to the user interface 202. Additionally, the user interface 202 may provide information on the current state of credentials in the system server 102. Users may be able to interact with the user interface 202 to implement the sharing process, withdrawal permissions, view status of credentials, etc. Some examples and characteristics of the user interface 202 or connected systems are described with reference to the user interface device 416 in FIG. 4. In addition, FIGS. 6A-8 provide screenshots of an example user interface 202 implemented in a security management system. The screenshots depict layouts of information related to credential sharing and buttons that may be selected by users. For instance, FIGS. 6A and 6B show the status of credentials in an example embodiment. These screenshots depict information related to the share status, credential ownership, to whom the credential is shared, etc. FIG. 7 is a screenshot of an overall management system that may include a "manage" tab in which credentials may be shared. FIG. 8 is a screenshot of share-credential window in which the selections 230 may be received in implement at least a portion of the sharing process 200. FIGS. 6A-8 represent some examples of digital user interfaces that may be implemented during the sharing process 200. FIGS. 6A-8 are not meant to be limiting. Other windows, arrangements of information, button inclusion or positioning, etc. may be included in the user interface 202.

The user credentials 104 of the system server 102 may include credentials for one or more or each of the users (e.g., 112 of FIG. 1). On the system server 102, the user credentials 104 may be encrypted. For instance, the user credentials 104 may be encrypted based on public keys of the users, which required a private key of the user to decrypt and use.

The user credentials 104 may be configured to control which of the users may perform tasks and operations through the management module 140. For example, in FIG. 2, a first user credential 206 is depicted. The first user credential 206 may be configured to control a first operation relative to the additional system 108. Accordingly, without the first user credential (or similar credential) a user is unable to implement the first operation. The first operation may include any task or process that the system server 102 may want to control. For instance, the first operation may include deployment of patches or software updates to the additional system 108, implementing a scan of the additional system 108, discovery of the additional system 108, accessing certain information on the additional system 108, other operations, or combinations thereof.

The first user credential 206 includes secure details 204. The secure details 204 include any information communicated or entered into the system server 102 (directly or indirectly) to authenticate the first user or the first user device 120A. The secure details 204 may include a password, a username, a biometric element, a two-factor authentication element, and the like. For instance, the secure details 204 may include a password. In normal (unshared operations), a first user may enter the password to the system server 102 to implement the first operation. However, without the password, the first user or another user may be unable to implement the first operation.

The user profiles 138 include records of information related to the users and user devices 120. For instance, the user profiles 138 may be connected to and/or integrated with credentials that are assigned to one or more of the users or user devices 120. For instance, the system server 102 may host and enable modification and management of the user profiles 138. In particular, a second user profile 208 may include a role of the second user and permissions and privileges assigned to the second user or second user device 120B. Similarly, a third user profile 210 may include a role of the third user and permissions and privileges assigned to the third user or third user device 120C. The user profiles 138 may be changed or appended with shared credentials as described below.

As mentioned above, the share module 106 and the user share modules 110 may include some of the same features and functions. In the embodiment of FIG. 2, the user share module 110 is described as performing many of the operations of the sharing process 200. In other embodiments some or all of the operations attributed to the share module 106 may be performed by one or more of the user share modules 110.

The share module 106 may include a creation module 222, a key generation module 220, an encryption module 218, a decryption module 216, or some combinations thereof. The creation module 222 may be configured to create or generate user credentials and/or user profiles 138. Creation of the user credentials 104 and/or user profiles 138 can include assignment of privileges, role requirements, etc.

associated with operations performed by the system server 102, the additional system 108 or the user devices 120. In the share process 200, the creation module 222 may be configured to create the first user credential 206. In an example of the share process 200, the first user credential 206 is configured such that entry of the secure details 204 of the first user credential 206 into the system server 102 enables execution of a first operation and without entry of the secure details 204 the execution of the first operation is prevented.

The share module 106 may then receive data indicative of selections 230 from the first user device 120A. The selections 230 may be entered into the user interface 202 and relayed to the share module 106. In some embodiments, the selections 230 includes a first selection of the first user credential 206 and a second selection of a second user who may be associated with the second user profile 208 and/or the second user device 120B.

The encryption module 218 and the key generation module 220 may be configured to encrypt the secure details 204 of the first user credential 206. For example, the key generation module 220 may be configured to generate or determine keys 238 used in the encryption of the secure details 204. The keys 238 include a unique session key and/or a public key of the second user or second user device 120B. The unique session key is determined specifically for a single instance of sharing the first user credential with the second user by the first user. The unique session key is generated for each new credential encryption (or re-encryption). The unique session key may be effectively an encrypted message or pass phrase that is generated only for the purpose of the singular message during the share process 200. In some embodiments, the unique session key may be determined according to the secure to the secure cryptographic message syntax standard. The unique session key may also include an advanced encryption standard (AES) key. The public key may be generated according to a suitable symmetric key algorithm.

Figure 3:
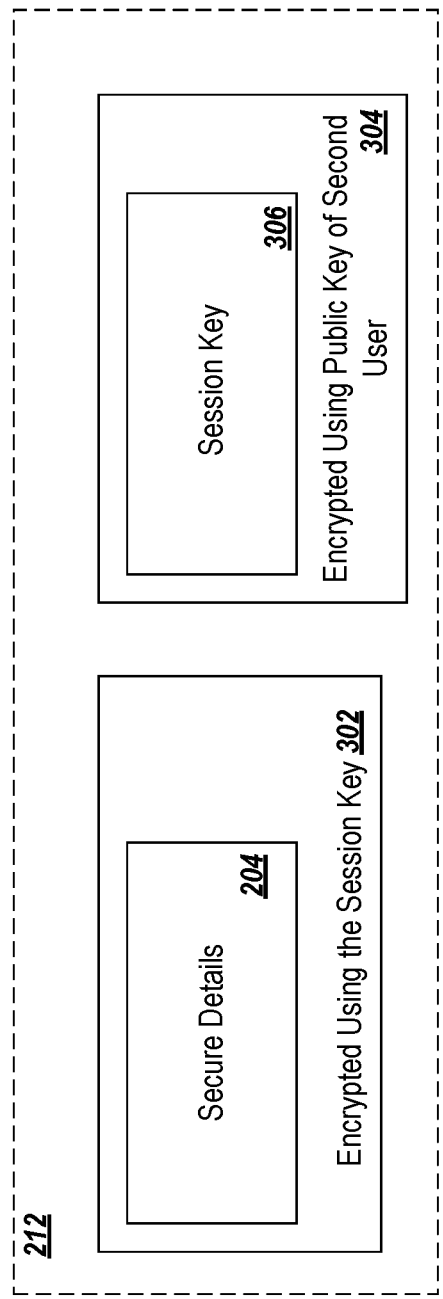
FIG. 3 depicts an encrypted package that may be implemented in the credential share process of FIG. 2.

The encryption module 218 may receive the keys 238 and access the secure details 204. The encryption module 218 may be configured to encrypt the secure details 204 such that the second user is capable of decrypting the secure details 204 and other users (e.g., the third user) are incapable of decrypting the secure details 204. For example, in some embodiments the encryption module 218 may receive the keys 238 and generate the encrypted package 212, which may be appended to the second user profile 208. In some embodiments, to generate the encrypted package 212, the encryption module 218 may encrypt the secure details 204 with the unique session key and encrypting the unique session key with the public key of the second user. Referring to FIG. 3, an example of the encrypted package 212 is shown. The encrypted package 212 may include the secure details 204 having an encryption 302 using the session key and a session key 306 having an encryption 304 using the public key of the second user 112B. Both of these may be appended to the second user profile 208 of FIG. 2.

The encryption described relative to the encrypted package 212 prevents any other user from accessing the secure details 204. Additionally, the encryption described relative to the encrypted package 212 controls access by the second user to the secure details. In particular, no other user is able to decrypt the unique session key without the private key of the second user. For instance, the second user device 120B may have to supply its private key 236 to the share module 106 to perform decryption of the unique session key. Moreover, the secure details 204 may not be decrypted without the unique session key, which is specifically generated for the specific instance of sharing the first user credentials 206 between the first user and the second user. Certificates of the unique session key may be revoked, which controls access to the secure details 204 by the second user.

The encrypted package 212 may remain encrypted until a request 228 to execute the first operation is received. During this period, the encrypted package 212 is not visible or accessible to the second user or to any other user that is associated with the system server 102. Responsive to the request 228, a decryption module 216 may utilize the private key 236 and decrypt the secure details 204. In some embodiments, the decrypting the secure details 204 of the credential includes decrypting the unique session key with the private key 236 of the second user and descripting the secure details 204 with the decrypted unique session key. The share module 106 may then enter decrypted secure details (e.g., the secure details 204). Entry of the secure details 204 may enable the management module 140 to implement the first operation responsive to the request 228. For instance, after entry of the decrypted secure details, the management module 140 may act on the request 228 and communicate execution instructions 214 to the additional system 108, which may change a system or state of the additional system (e.g., update a software, deploy a patch, update an application, etc.).

When the first user or the system server 102 wants to withdraw the credential sharing, the first user device 120A may communicate a withdraw notification 224. In some embodiments, the withdraw notification 224 may be received by the user interface 202 and be communicated to the share module 106. Responsive to the withdraw notification 224, revoking a certificate associated with the encrypting of the secure details 204 may be revoked. For instance, the unique session key certificate may be revoked. Additionally or alternatively, the certificate associated with the second user may be revoked. The encryption module 218 may then re-encrypting the secure details 204 or the first user credential 206. For instance, the secure details 204 or the first user credential 206 may be re-encrypted using a public key of the first user. The secure details 204 may then be accessed by the private key of the first user for any additional use.

The share process 200 is not limited to a single credential share between a single pair of users. For instance, the share process 200 may enable the first user credential 206 to be shared with the second user and the third user. In these embodiments, the share module 106 may receive additional selections (e.g., the selections 230) in the user interface 202. The additional selections may include a third selection of the credential and a fourth selection of a third user. Responsive to the third and fourth selections, the key generation module 220 and the encryption module 218 may encrypt the secure details 204 for the third user. In some embodiments, the encryption for the third user may include determining an additional unique session key specifically for a single instance of sharing the credential with the third user by the first user. After the additional unique session key is determined, the encryption module 218 may encrypt the secure details 204 with the additional unique session key and encrypt the unique session key with a public key of the third user. These encryption operations may result in a second encrypted package (e.g., 212) appended to the third user profile 210. Alternatively, one unique session key may be used for both the second user and the third user. In these embodiments, the secure details 204 may be encrypted with the unique session key (same used for the second user) and then the unique session key may be encrypted with the public key of the third user. Again, this may result in an additional encrypted package 212.

The share process 200 is also not limited to sharing a single credential to a single user. For instance, the share process 200 may enable the first user credential 206 to be shared with the second user and a second user credential 237 to be shared with the third user. Such multiple credential sharing may occur during the same period or during overlapping periods. For instance, in some embodiments, the second user credential 237 may restrict or control a second operation. To share the second user credential 237, additional selections 230 may be received from the first user device 120A. The additional selections may include a selection of the second user credential and a selection of the third user. Responsive to these selections, the key generation module 220 and the encryption module 218 may encrypt secure details of the second user credential 237 for the third user. The encryption of the secure details of the second user credentials 237 may be substantially equivalent to the encryption described above and with reference to FIG. 3 and may create an additional encrypted package.

The additional encrypted package may be appended to the third user profile 210. As described above relative to the second user, the third user may then communicate an execution request of the second operation, which may trigger decryption and entry of the encrypted package such that the third user can implement the second operation. Both credential sharing might occur during the same or an overlapping period.

Additionally still, the share process 200 is not limited to a single credential share between a single pair of users. Instead, the share process 200 enables chains of sharing the user credentials 206. For instance, the share process 200 may enable the first user credential 206 to be shared with the second user and the second user to be additionally shared with the third user.

For instance, the second user may communicate some selections to the user interface 202 with a selection of the first user credential 206 appended to the second user profile 208. The second user may further communicate a selection of the third user. Responsive to the selections, the key generation module 220 and the encryption module 218 may further encrypt the secure details 204 of the first user credentials 206.

In some embodiments, the key generation module 220 may generate an additional unique session key specifically for a single instance of sharing the credential with the third user by the second user. The encrypted package 212 may be encrypted based on the additional unique session key and then encrypt the additional unique session key with the public key of the third user. In these and other embodiments, both the private key of the third user and the second user may be involved in decryption.

In some embodiments, responsive to the selections by the second user, the decryption module 216 may decrypt the encrypted package 212 and then encrypt the secure details 204 using the additional unique session key and encrypt the additional unique session key with the public key of the third user.

Figure 4:
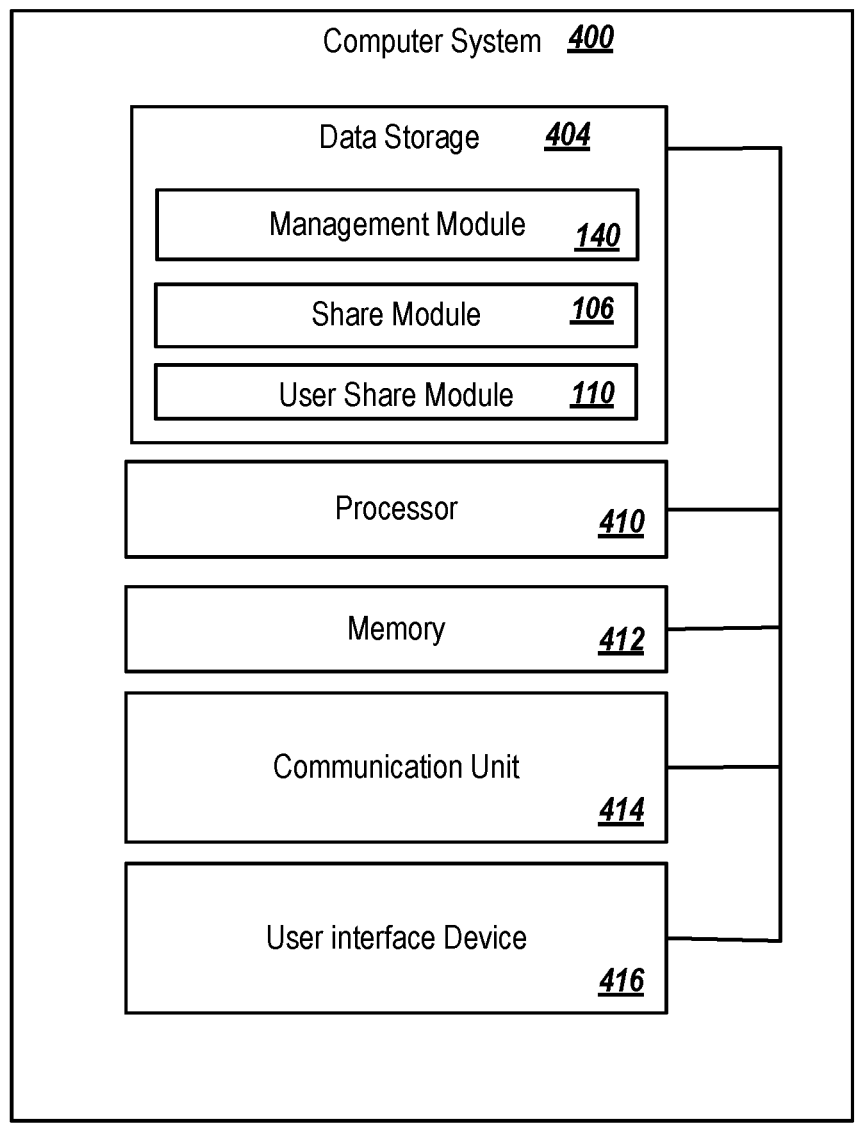
FIG. 4 illustrates an example computer system configured for credential sharing.

FIG. 4 illustrates an example computer system 400 configured for credential sharing, according to at least one embodiment of the present disclosure. The computer system 400 may be implemented in the operating environment 100 FIG. 1, for instance. Examples of the computer system 400 may include one or both of the system server 102 and one or more of the user devices 120. The computer system 400 may include one or more processors 410, a memory 412, a communication unit 414, a user interface device 416, and a data storage 404 that includes the management module 140, the share module 106, the user share module 110, (collectively, modules 140/106/110).

The processor 410 may include any suitable special-purpose or general-purpose computer, computing entity, or processing device including various computer hardware or software modules and may be configured to execute instructions stored on any applicable computer-readable storage media. For example, the processor 410 may include a microprocessor, a microcontroller, a digital signal processor (DSP), an ASIC, an FPGA, or any other digital or analog circuitry configured to interpret and/or to execute program instructions and/or to process data. Although illustrated as a single processor in FIG. 4, the processor 410 may more generally include any number of processors configured to perform individually or collectively any number of operations described in the present disclosure. Additionally, one or more of the processors 410 may be present on one or more different electronic devices or computing systems. In some embodiments, the processor 410 may interpret and/or execute program instructions and/or process data stored in the memory 412, the data storage 404, or the memory 412 and the data storage 404. In some embodiments, the processor 410 may fetch program instructions from the data storage 404 and load the program instructions in the memory 412. After the program instructions are loaded into the memory 412, the processor 410 may execute the program instructions.

The memory 412 and the data storage 404 may include computer-readable storage media for carrying or having computer-executable instructions or data structures stored thereon. Such computer-readable storage media may include any available media that may be accessed by a general-purpose or special-purpose computer, such as the processor 410. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 410 to perform a certain operation or group of operations.

The communication unit 414 may include one or more pieces of hardware configured to receive and send communications. In some embodiments, the communication unit 414 may include one or more of an antenna, a wired port, and modulation/demodulation hardware, among other communication hardware devices. In particular, the communication unit 414 may be configured to receive a communication from outside the computer system 400 and to present the communication to the processor 410 or to send a communication from the processor 410 to another device or network (e.g., 122 of FIG. 1).

The user interface device 416 may include one or more pieces of hardware configured to receive input from and/or provide output to a user. In some embodiments, the user interface device 416 may include one or more of a speaker, a microphone, a display, a keyboard, a touch screen, or a holographic projection, among other hardware devices.

The modules 140/106/110 may include program instructions stored in the data storage 404. The processor 410 may be configured to load the modules 140/106/110 into the memory 412 and execute the modules 140/106/110. Alternatively, the processor 410 may execute the modules 140/106/110 line-by-line from the data storage 404 without loading them into the memory 412. When executing the modules 140/106/110, the processor 410 may be configured to perform one or more processes or operations described elsewhere in this disclosure.

Modifications, additions, or omissions may be made to the computer system 400 without departing from the scope of the present disclosure. For example, in some embodiments, the computer system 400 may not include the user interface device 416. In some embodiments, the different components of the computer system 400 may be physically separate and may be communicatively coupled via any suitable mechanism. For example, the data storage 404 may be part of a storage device that is separate from a device, which includes the processor 410, the memory 412, and the communication unit 414, that is communicatively coupled to the storage device. The embodiments described herein may include the use of a special-purpose or general-purpose computer including various computer hardware or software modules, as discussed in greater detail below.

Figure 5A:
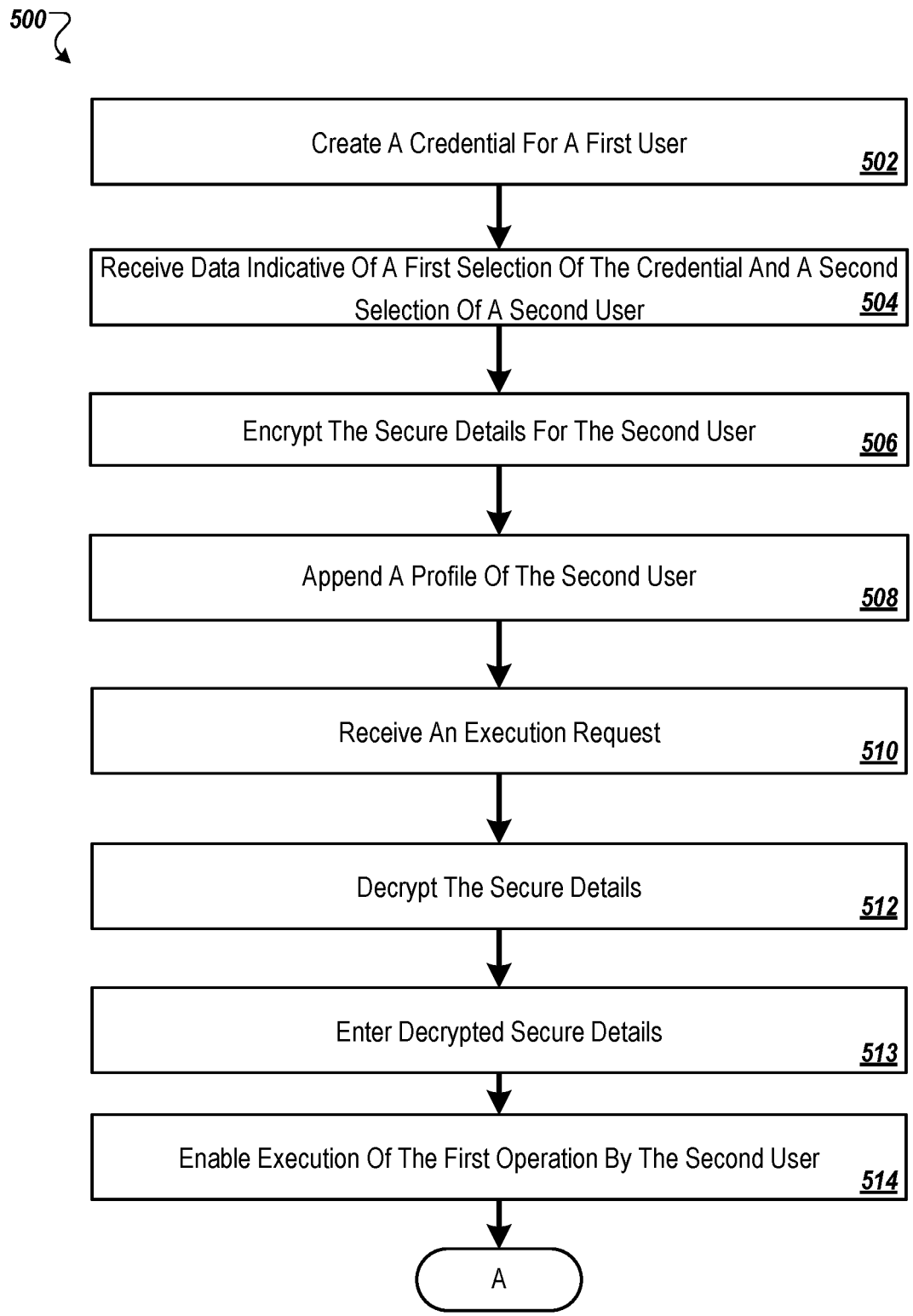
FIGS. 5A and 5B are a flowchart of an example method of credential sharing between users in a system.
Figure 5B:
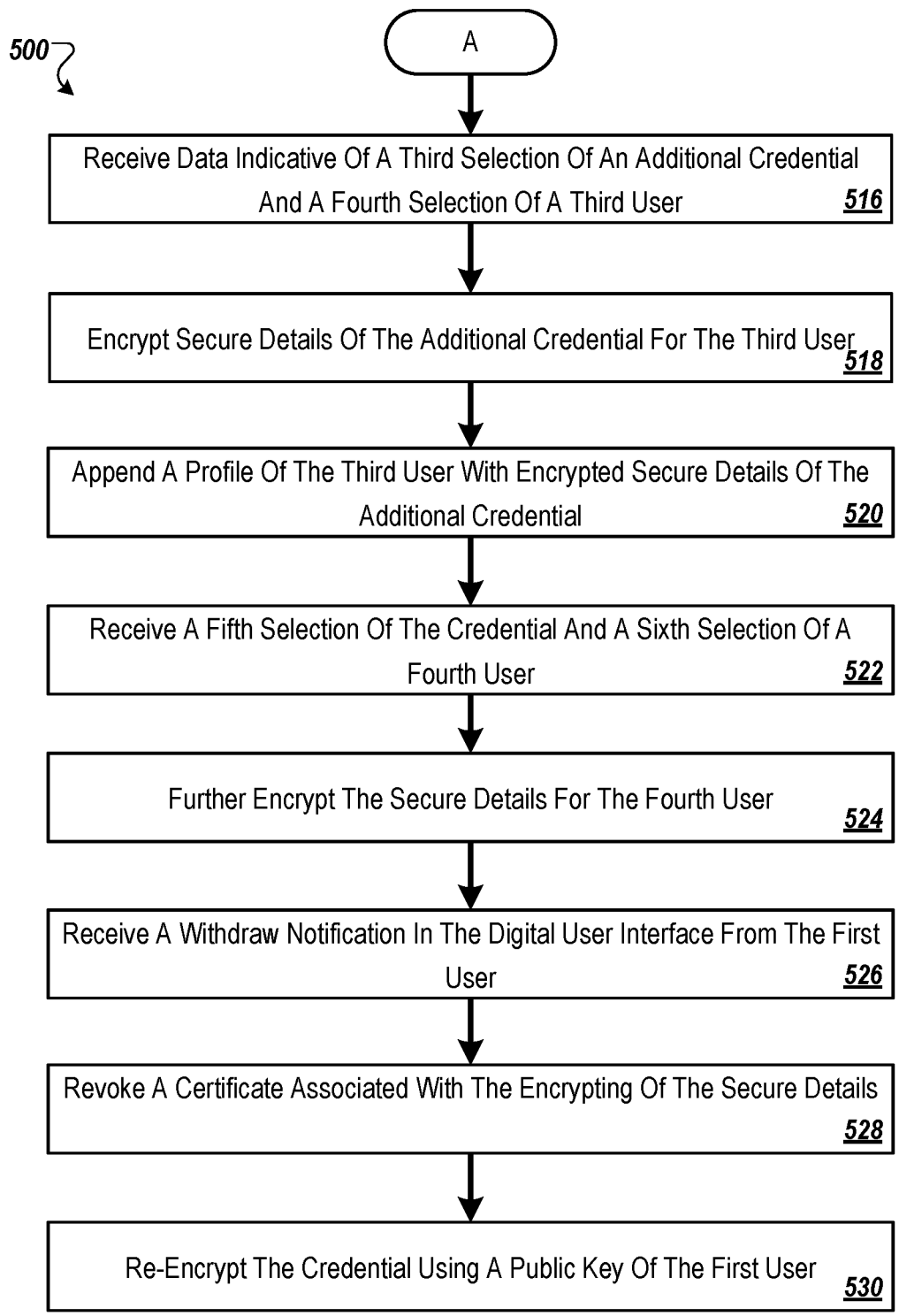

FIGS. 5A and 5B are a flowchart of an example method 500 of credential sharing between users in a system, according to at least one embodiment described in the present disclosure. As described elsewhere in the present disclosure, the method 500 may be implemented to share credentials to only one or more specific users of multiple users managed by a system.

The method 500 may be performed in a suitable operating environment such as the operating environment 100 of FIG. 1. The method 500 may be performed by one or more of the system server 102 described elsewhere in the present disclosure or by another suitable computing system, such as the computer system 400 of FIG. 4. In some embodiments, the system server 102 or the other computing system may include or may be communicatively coupled to a non-transitory computer-readable medium (e.g., the memory 412 of FIG. 4) having stored thereon programming code or instructions that are executable by one or more processors (such as the processor 410 of FIG. 4) to cause a computing system or the system server 102 to perform or control performance of the method 500. Additionally or alternatively, the system server 102 may include the processor 410 that is configured to execute computer instructions to cause the system server 102 or another computing systems to perform or control performance of the method 500. The system server 102 or the computer system 400 implementing the method 500 may be included in a cloud-based managed network, an on-premises system, or another suitable network computing environment.

With reference to FIG. 5A, the method 500 may begin at block 502 in which a credential for a first user is created. The credential may be configured such that entry of secure details of the credential into the system enables execution of a first operation and such that without entry of the secure details the execution of the first operation is prevented. In some embodiments, the system may include a patch management system. In these and other embodiments, the first operation may include a patch management operation such as deploying a patch, accessing a database, scanning one or more devices, etc. In some embodiments, the system is an on-premises managed network which may include, for instance, multiple client or user devices associated with users and a management device or server.

At block 504, one or more selections or user input may be received. For instance, a first selection of the credential and a second selection of a second user may be received by the system or a digital user interface of the system. In some embodiments, the first user and the second user are users of a plurality of users or user profiles managed in the system or a network including the system. In some embodiments, the second user is a background service that provides a default credential to multiple users. In some embodiments, the first user is a senior administrative user, and the second user is a junior administrative user.

At block 506, secure details of the credential may be encrypted. The secure details may be encrypted responsive to the first and second selections. The secure details may include a password, a username, a biometric element or feature, a pass phrase, another secure piece of information used for authentication, or combinations thereof. The secure details may be encrypted such that the second user is capable of decrypting the secure details and other users of the system are incapable of decrypting the secure details. For instance, in some embodiments, the encrypting includes determining a unique session key specifically for a single instance of sharing the credential with the second user by the first user. The unique session key may be generated according to a secure cryptographic message syntax message standard and/or include an advanced encryption standard (AES) key. The encrypting the secure details may further include encrypting the secure details with the unique session key and encrypting the unique session key with a public key of the second user. Accordingly, to decrypt the secure details, the public key of the second user can be used to decrypt the unique session key and the unique session key may be used to decrypt the secure details.

At block 508, a profile of the second user may be appended with encrypted secure details of the credential. Accordingly, the system and or the second user may have the credentials available to the profile. At block 510, an execution request may be received. The execution request may be configured to perform the first operation from the second user. Without the shared credential, the second user would be unable to execute the request because the second user would not have the necessary privileges.

At block 512, the secure details may be decrypted. The secure details may be decrypted responsive to or only responsive to the execution request. For instance, the decryption may occur in real time and only in response the execution request. In some embodiments, the secure details may be otherwise decrypted based on another trigger. In some embodiments, the decrypting the secure details of the credential includes decrypting the unique session key with a private key of the second user and then descripting the secure details with the decrypted unique session key.

At block 513, decrypted secure details may be entered into the system. Similar to the decryption, the secure details may be entered responsive to the execution request and/or decryption of the secure details. For instance, in some embodiments, the decryption and entry of the secure details may be automatic in response to the receipt of the execution request. At block 514, execution of the first operation by the second user may be enabled or implemented. For example, after entry of the decrypted secure details, execution of the first operation by the second user may be enabled or implemented.

Referring to FIG. 5B, at block 516 additional selection may be received. For instance at block 516 a third selection of an additional credential of multiple credentials of the first user and a fourth selection of a third user may be received. The third user may be another user of the users managed in the system. As above, the selections or user input may be received in the digital user interface from the first user. In embodiments implementing the operation of block 516, the credential described above is a first credential of multiple credentials of the first user.

At block 518, secure details of the additional credentials may be encrypted. The secure details of the additional credentials may be encrypted responsive to the third and fourth selections. The encryption of the secure details of the additional credential may be specific for the third user. In particular, only the third user may be able to access the secure details of the additional credential. For instance, the secure details of the additional credentials may be encrypted as described above with reference to block 506 (e.g., using a unique session key and a public key of the third user). At block 520, a profile of the third user may be appended with encrypted secure details of the additional credential. The profile of the third user may be appended at least partially during a period in which the profile of the second user is appended with the encrypted secure details of the first credential. Accordingly, the method 500 may enable a first credential to be shared with the second user and at least partially during the same time enable another credential to be shared with the third user.

At block 522, additional selections or user input may be received. For instance, a fifth selection of the credential and a sixth selection of a fourth user may be received. The fourth user is a user of the users managed by the system or a network including the system. The fifth and sixth selections may be received in the digital user interface. At block 524 the secure details of the credentials may be encrypted. For instance, responsive to the fifth and sixth selections the secure details may be encrypted for the fourth user. For instance, the encryption of the secure details for the fourth may include determining an additional unique session key specifically for a single instance of sharing the credential with the fourth user by the first user. The encryption may further include encrypting the secure details with the additional unique session key and encrypting the unique session key with a public key of the fourth user. Accordingly, the credential may be shared with the second user and the fourth user at least partially during the same time. In these circumstance, only the fourth and the second users (or any other user to whom the credential is shared) of all the users managed by the system may execute the first operation.

At block 526, a withdraw notification may be received. The withdraw notification may be received in the digital user interface from the first user. The withdraw notification may be configured to withdraw the shared certification with the second user. At block 528. a certificate associated with encryption of the secure details may be revoked. For instance, the certificate of the public key and/or the unique session key may be revoked. The certificate may be revoked responsive to the withdraw notification. At block 530, the credential may be re-encrypted. For instance, the credential may be re-encrypted using a public key of the first user.

Accordingly, sharing the credential with the second user enables implementation of the first operation by the second user under control of the first user. The first user may share this credential with another user and may share another credential with another user. Because the encryption includes the public key of the receiving user and the session key, the sharing of the credential can be tightly controlled.

Additionally, in some embodiments of the method 500, the credentials may be further shared. For instance, a first user may share a credential with a second user and the second user may then share the same credential with a fifth user. For instance, in these and other embodiments, the method 500 may include receiving from the second user in an additional digital user interface, a selection of the credential and a selection of a fifth user, wherein the fifth user is a user managed by the system. Responsive to the selections, the method 500 may include further encrypting the secure details for the fifth user. In some embodiments, the further encrypting includes determining an additional unique session key specifically for a single instance of sharing the credential with the fifth user by the second user. The further encryption may further include encrypting the secure details with the additional unique session key and encrypting the unique session key with a public key of the fifth user.

Further, modifications, additions, or omissions may be made to the methods without departing from the scope of the present disclosure. For example, the operations of methods may be implemented in differing order. Furthermore, the outlined operations and actions are only provided as examples, and some of the operations and actions may be optional, combined into fewer operations and actions, or expanded into additional operations and actions without detracting from the disclosed embodiments.

Although illustrated as discrete blocks, one or more blocks in FIGS. 5A and 5B may be divided into additional blocks, combined into fewer blocks, or eliminated, depending on the desired implementation.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general-purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

The various features illustrated in the drawings may not be drawn to scale. The illustrations presented in the present disclosure are not meant to be actual views of any particular apparatus (e.g., device, system, etc.) or method, but are representations employed to describe embodiments of the disclosure. Accordingly, the dimensions of the features may be expanded or reduced for clarity. In addition, some of the drawings may be simplified for clarity. Thus, the drawings may not depict all of the components of a given apparatus (e.g., device) or all operations of a particular method.

Terms used in the present disclosure and the claims (e.g., bodies of the appended claims) are intended as "open" terms (e.g., the term "including" should be interpreted as "including, but not limited to," the term "having" should be interpreted as "having at least," the term "includes" should be interpreted as "includes, but is not limited to," among others). Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in instances in which a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Further, any disjunctive word or phrase presenting two or more alternative terms should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

The terms "first," "second," "third," etc., are not necessarily used to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present inventions have been described in detail, it should be understood that the various changes, substitutions, and alterations could be made hereto without departing from the scope of the invention.

What is claimed is:

1. A method of credential sharing between users in a system, the method comprising:

creating a credential for a first user, the credential being configured such that entry of secure details of the credential into the system enables execution of a first operation and without entry of the secure details the execution of the first operation is prevented;

receiving data indicative of a first selection of the credential and a second selection of a second user, wherein the first user and the second user are users of a plurality of users managed in the system;

responsive to the data indicative of the first and second selections, encrypting the secure details such that the second user is capable of decrypting the secure details and other users of the plurality of the users are incapable of decrypting the secure details, wherein the encrypting includes determining a unique session key specifically for a single instance of sharing the credential with the second user by the first user; encrypting the secure details with the unique session key; and encrypting the unique session key with a public key of the second user;

appending a profile of the second user with encrypted secure details of the credential;

receiving an execution request to perform the first operation from the second user;

responsive to the execution request, decrypting the secure details of the credential and entering decrypted secure details into the system, wherein the decrypting the secure details of the credential includes decrypting the unique session key with a private key of the second user, and descripting the secure details with the decrypted unique session key; and after entry of the decrypted secure details, authenticating the second user using the secure details and enabling execution of the first operation by the second user.

2. The method of claim 1, further comprising automatically entering the decrypted secure details such that security criteria for the first operation are satisfied.

3. The method of claim 1, wherein the unique session key is generated according to a secure cryptographic message syntax message standard.

4. The method of claim 1, further comprising:
receiving data that is indicative of a third selection of the credential and a fourth selection of a third user, wherein the third user is a user of the plurality of users;
responsive to the third and fourth selections, further encrypting the secure details for the third user, wherein the further encrypting includes:
determining an additional unique session key specifically for a single instance of sharing the credential with the third user by the first user;
encrypting the secure details with the additional unique session key; and
encrypting the unique session key with a public key of the third user.

5. The method of claim 1, further comprising:
receiving from the second user, a third selection of the credential shared from the first user and a fourth selection of a third user, wherein the third user is a user of the plurality of users;
responsive to the third and fourth selections, further encrypting the secure details for the third user, wherein the further encrypting includes:
determining an additional unique session key specifically for a single instance of sharing the credential with the third user by the second user;
encrypting the secure details with the additional unique session key; and
encrypting the unique session key with a public key of the third user.

6. The method of claim 1, wherein the unique session key includes an advanced encryption standard (AES) key.

7. The method of claim 1, further comprising:
receiving data indicative of a withdraw notification from the first user;
responsive to the withdraw notification, revoking a certificate associated with the encrypting of the secure details; and
re-encrypting the credential using a public key of the first user.

8. The method of claim 1, wherein the credential is a first credential of a plurality of credentials of the first user, the method further comprising:
receiving data indicative of a third selection of an additional credential of the plurality of credentials and a fourth selection of a third user, wherein the third user is a user of the plurality of users;
responsive to the third and fourth selections, encrypting secure details of the additional credential for the third user; and
appending a profile of the third user with encrypted secure details of the additional credential at least partially during a period in which the profile of the second user is appended with the encrypted secure details of the first credential.

9. The method of claim 1, wherein:
the system is a patch management system, and the first operation includes a patch management operation; or
the system is an on-premises managed network including a plurality of client devices associated with the plurality of users and a management device.

10. A non-transitory computer-readable medium having encoded therein programming code executable by one or more processors to perform or control performance of operations comprising:
creating a credential for a first user, the credential being configured such that entry of secure details of the credential into a system enables execution of a first operation and without entry of the secure details the execution of the first operation is prevented;
receiving data indicative of a first selection of the credential and a second selection of a second user, wherein the first user and the second user are users of a plurality of users managed in the system;
responsive to the data indicative of the first and second selections, encrypting the secure details such that the second user is capable of decrypting the secure details and other users of the plurality of the users are incapable of decrypting the secure details, wherein the encrypting includes determining a unique session key specifically for a single instance of sharing the credential with the second user by the first user; encrypting the secure details with the unique session key; and encrypting the unique session key with a public key of the second user;
appending a profile of the second user with encrypted secure details of the credential;
receiving an execution request to perform the first operation from the second user;
responsive to the execution request, decrypting the secure details of the credential and entering decrypted secure details into the system, wherein the decrypting the secure details of the credential includes decrypting the unique session key with a private key of the second user, and descripting the secure details with the decrypted unique session key; and
after entry of the decrypted secure details, authenticating the second user using the secure details and enabling execution of the first operation by the second user.

11. The non-transitory computer-readable medium of claim 10, wherein the operations further comprise automatically entering the decrypted secure details such that security criteria for the first operation are satisfied.

12. The non-transitory computer-readable medium of claim 10, wherein the unique session key is generated according to a secure cryptographic message syntax message standard.

13. The non-transitory computer-readable medium of claim 10, wherein the operations further comprise:
receiving data that is indicative of a third selection of the credential and a fourth selection of a third user, wherein the third user is a user of the plurality of users;
responsive to the third and fourth selections, further encrypting the secure details for the third user, wherein the further encrypting includes:
determining an additional unique session key specifically for a single instance of sharing the credential with the third user by the first user;
encrypting the secure details with the additional unique session key; and
encrypting the unique session key with a public key of the third user.

14. The non-transitory computer-readable medium of claim 10, wherein the operations further comprise:
receiving from the second user, a third selection of the credential shared from the first user and a fourth selection of a third user, wherein the third user is a user of the plurality of users;

responsive to the third and fourth selections, further encrypting the secure details for the third user, wherein the further encrypting includes:
  determining an additional unique session key specifically for a single instance of sharing the credential with the third user by the second user;
  encrypting the secure details with the additional unique session key; and
  encrypting the unique session key with a public key of the third user.

15. The non-transitory computer-readable medium of claim 10, wherein the unique session key includes an advanced encryption standard (AES) key.

16. The non-transitory computer-readable medium of claim 10, wherein the operations further comprise:
  receiving data indicative of a withdraw notification from the first user;
  responsive to the withdraw notification, revoking a certificate associated with the encrypting of the secure details; and
  re-encrypting the credential using a public key of the first user.

17. The non-transitory computer-readable medium of claim 10, wherein:
  the credential is a first credential of a plurality of credentials of the first user; and
  the operations further comprise:
    receiving data indicative of a third selection of an additional credential of the plurality of credentials and a fourth selection of a third user, wherein the third user is a user of the plurality of users;
    responsive to the third and fourth selections, encrypting secure details of the additional credential for the third user; and
    appending a profile of the third user with encrypted secure details of the additional credential at least partially during a period in which the profile of the second user is appended with the encrypted secure details of the first credential.

18. The non-transitory computer-readable medium of claim 10, wherein:
  the system is a patch management system, and the first operation includes a patch management operation; or
  the system is an on-premises managed network including a plurality of client devices associated with the plurality of users and a management device.

* * * * *